(12) United States Patent
Jalalibarsari

(10) Patent No.: US 11,914,606 B2
(45) Date of Patent: Feb. 27, 2024

(54) SYSTEMS AND METHODS FOR A MACHINE LEARNING FRAMEWORK

(71) Applicant: Walmart Apollo, LLC, Bentonville, AR (US)

(72) Inventor: Vahid Jalalibarsari, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 525 days.

(21) Appl. No.: 16/291,927

(22) Filed: Mar. 4, 2019

(65) Prior Publication Data
US 2020/0285649 A1 Sep. 10, 2020

(51) Int. Cl.
G06F 16/25 (2019.01)
G06F 9/445 (2018.01)
G06F 16/2455 (2019.01)
G06N 20/00 (2019.01)
H04L 67/00 (2022.01)

(52) U.S. Cl.
CPC ........ *G06F 16/254* (2019.01); *G06F 9/44505* (2013.01); *G06F 16/2456* (2019.01); *G06N 20/00* (2019.01); *H04L 67/34* (2013.01)

(58) Field of Classification Search
CPC .............. G06F 16/254; G06F 9/44505; G06F 16/2456; G06F 11/3476; G06N 20/00; H04L 67/34; H04L 67/2823
See application file for complete search history.

(56) References Cited

U.S. PATENT DOCUMENTS 6,192,360 B1* 2/2001 Dumais ................ G06K 9/6269 2/5
10,469,306 B1 11/2019 Boles et al.
(Continued)

OTHER PUBLICATIONS

Wikipedia, Join (SQL), https://web.archive.org/web/20071105/180550/https://en.wikipedia.org/wiki/Join_(SQL), Nov. 5, 2007, 11 pp. (Year: 2007).*

(Continued)

*Primary Examiner* — Marc S Somers
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and perform acts of receiving, from an extraction, transform, load (ETL) application, a matrix, which can comprise raw feature data; storing the matrix comprising the raw feature data in a standard format in the one or more non-transitory computer readable storage devices; receiving a configuration file over a computer network; storing the configuration file in a standard format in the one or more non-transitory computer readable storage devices; instantiating one or more unifier applications based upon the configuration file; identifying relevant feature data of the raw feature data; storing the relevant feature data in a standardized format in an output file in the one or more non-transitory computer-readable storage devices; and transmitting, over the computer network in real time to a model building system, the output file comprising the relevant feature data from the one or more non-transitory computer-readable storage devices, so that the machine learning model building applications have immediate access to up-to-date data. Other embodiments are disclosed herein.

20 Claims, 11 Drawing Sheets

(56) References Cited

U.S. PATENT DOCUMENTS

| | | | |
|---|---|---|---|
| 10,705,812 B2 | 7/2020 | Seetharaman et al. | |
| 11,010,284 B1 | 5/2021 | Santiago et al. | |
| 2004/0177062 A1* | 9/2004 | Urquhart | G06F 16/258 |
| 2008/0285464 A1* | 11/2008 | Katzir | H04L 63/20 |
| | | | 370/241 |
| 2010/0287160 A1* | 11/2010 | Pendar | G06F 16/90 |
| | | | 707/E17.089 |
| 2014/0358826 A1* | 12/2014 | Traupman | G06N 5/02 |
| | | | 706/46 |
| 2015/0213372 A1* | 7/2015 | Shah | G06Q 10/107 |
| | | | 706/12 |
| 2015/0235258 A1* | 8/2015 | Shah | G06Q 30/0242 |
| | | | 705/14.45 |
| 2017/0006135 A1 | 1/2017 | Siebel et al. | |
| 2017/0091657 A1 | 3/2017 | Kida et al. | |
| 2018/0295154 A1 | 10/2018 | Crabtree et al. | |
| 2019/0095599 A1* | 3/2019 | Iliofotou | G06F 16/337 |
| 2019/0163544 A1 | 5/2019 | Ekambaram et al. | |
| 2019/0266170 A1* | 8/2019 | Hazel | G06F 16/221 |
| 2019/0324767 A1* | 10/2019 | Stein | G06F 8/71 |
| 2020/0110761 A1 | 4/2020 | Cooper et al. | |
| 2020/0184017 A1* | 6/2020 | Batra | G06F 40/295 |

OTHER PUBLICATIONS

Wikipedia, Path (computing), https://web.archive.org/web/20070105235649/https://en.wikipedia.org/wiki/Path_(computing), Jan. 5, 2007, 4 pp. (Year: 2007).*

* cited by examiner

```
[
    {
        "unifier":"EmailRecipientUnifier",
        "start_date":"2018-10-28",
        "time_periods": [
            {
                "duration":6,
                "name":"label"
            },
            {
                "duration":89,
                "name":"quarter1"
            }
        ]
    },
    {
        "unifier":"EmailResponseUnifier",
        "start_date":"2018-10-28",
        "time_periods": [
            {
                "duration":6,
                "name":"label"
            },
            {
                "duration":89,
                "name":"quarter1"
            }
        ]
    }
]
```

FIG. 11

```
{
  "trainSchema" : ["oms_customer_id","pg_cust_acct_id","email_address",
"response_batch_open_cnt_l","recipient_batch_cnt_3m1","recipient_batch_cnt_3m2",
"response_batch_open_cnt_3m1","response_batch_open_cnt_3m2"],
  "testSchema": ["oms_customer_id","pg_cust_acct_id","email_address",
"response_batch_open_cnt_l","recipient_batch_cnt_3m1","recipient_batch_cnt_3m2",
"response_batch_open_cnt_3m1","response_batch_open_cnt_3m2"],
  "features" : ["recipient_batch_cnt_3m1","recipient_batch_cnt_3m2",
"response_batch_open_cnt_3m1","response_batch_open_cnt_3m2"],
  "label": [{"levelDict":"emailTypeMap", "fieldNames":["response_batch_open_cnt_l"]}],
  "keys": ["oms_customer_id","pg_cust_acct_id","email_id_all_all"],
  "syntheticFields": [{"firstOperand":"response_batch_open_cnt_3m1",
"secondOperand":"recipient_batch_cnt_3m1","operation":"division"}],
"transformersFlow":["EmailGrandFilter","FieldKeeper","SimpleAggregator","CRMStandardizer"],
"model":{"name":"LogistictRegression","RegParam":0.3, "ElasticNetParam":1,"MaxIter":100}
}
```

FIG. 12

SYSTEMS AND METHODS FOR A MACHINE LEARNING FRAMEWORK

TECHNICAL FIELD

This disclosure relates generally to creation and management of machine learning algorithms, and more particularly relates to systems and methods for a framework for the creation and management of machine learning algorithms.

BACKGROUND

The recent rise of big data has led many organizations to use machine learning algorithms in their practice. This rapid adoption of machine learning algorithms, though, presents a number of problems inherent in machine learning algorithms, and therefore problems confined to computer systems. First, while application of machine learning algorithms can be beneficial for an organization, the startup costs can be very high for a number of reasons.

Building a machine learning algorithm is time, labor, and computing resource intensive. Raw data needs to be standardized and converted into a workable format for each algorithm created. Labels for the data also need to be identified from the standardized raw data for each algorithm created. Different mathematical models then need to be trained on this labeled data to determine which mathematical model gives the best outcomes.

Each of the steps outlined in the paragraph above involve the creation of bespoke computer programs for the specific task involved with the creation of the specific model. Further, oftentimes these computer programs are so customized, that they cannot be reused when a similar machine learning model is generated. This result, then, leads data scientists and computer system engineers spending large amounts of time creating custom-made programs to train a single machine learning algorithm. There is a need, then, for a system and/or method for a machine learning framework that minimizes the coding time required to create a machine learning model.

BRIEF DESCRIPTION OF THE DRAWINGS

To facilitate further description of the embodiments, the following drawings are provided in which:

FIG. 11 illustrates a representative embodiment of a configuration file, according to an additional embodiment; and FIG. 12 illustrates a representative embodiment of a configuration file, according to an additional embodiment.

Figure 1:
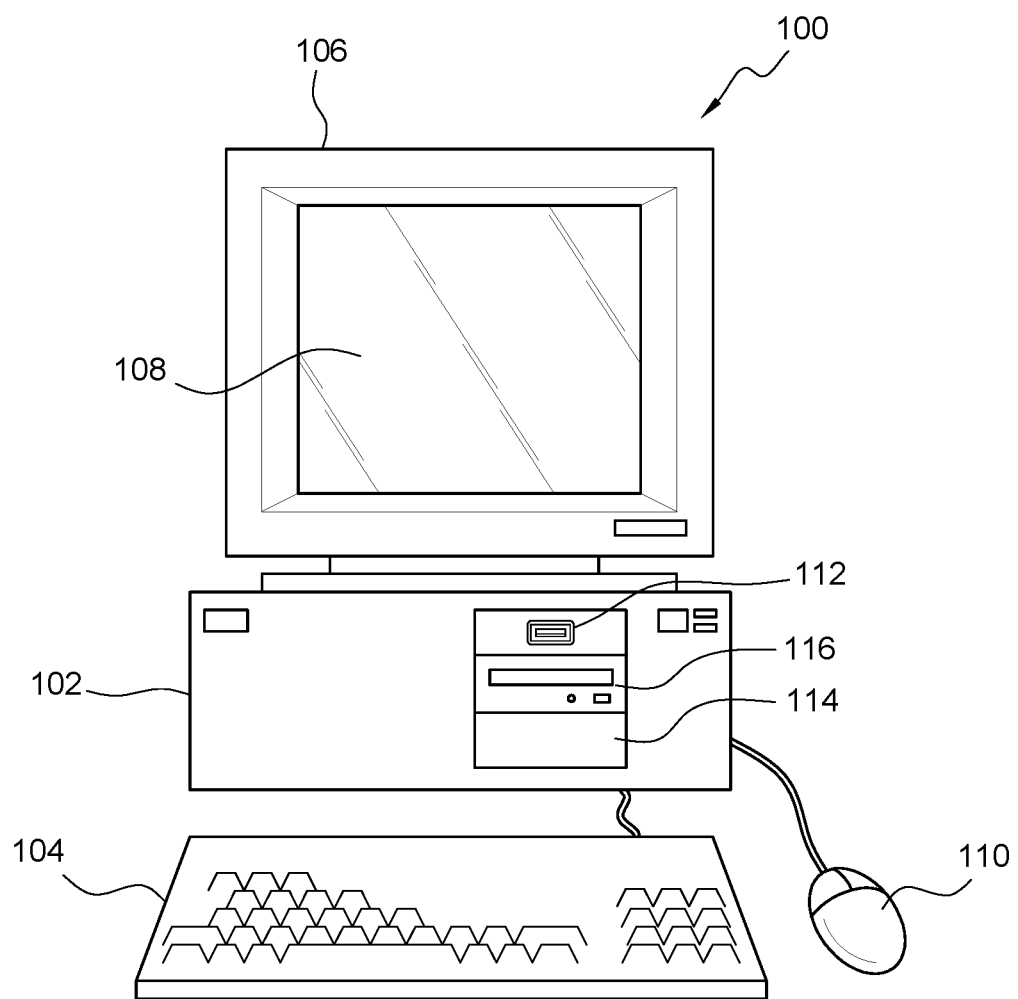
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time"

can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory storage devices storing computing instructions configured to run on the one or more processors. The computing instructions can be configured to run on the one or more processors and perform acts of receiving, from an extraction, transform, load (ETL) application, a matrix, which can comprise raw feature data; storing the matrix comprising the raw feature data in a standard format in the one or more non-transitory computer readable storage devices; receiving a configuration file over a computer network; storing the configuration file in a standard format in the one or more non-transitory computer readable storage devices; instantiating one or more unifier applications based upon the configuration file; identifying relevant feature data of the raw feature data; storing the relevant feature data in a standardized format in an output file in the one or more non-transitory computer-readable storage devices; and transmitting, over the computer network in real time to a model building system, the output file comprising the relevant feature data from the one or more non-transitory computer-readable storage devices, so that the machine learning model building applications have immediate access to up-to-date data.

Various embodiments include a method. The method can include receiving, from an extraction, transform, load (ETL) application, a matrix, which can comprise raw feature data; storing the matrix comprising the raw feature data in a standard format in the one or more non-transitory computer readable storage devices; receiving a configuration file over a computer network; storing the configuration file in a standard format in the one or more non-transitory computer readable storage devices; instantiating one or more unifier applications based upon the configuration file; identifying relevant feature data of the raw feature data; storing the relevant feature data in a standardized format in an output file in the one or more non-transitory computer-readable storage devices; and transmitting, over the computer network in real time to a model building system, the output file comprising the relevant feature data from the one or more non-transitory computer-readable storage devices, so that the machine learning model building applications have immediate access to up-to-date data.

A number of embodiments can include a system. The system can include one or more processors and one or more non-transitory storage devices storing computing instructions configured to run on the one or more processors. The computing instructions can be configured to run on the one or more processors and perform acts of creating a configuration file which can comprise: one or more attributes defining a machine learning algorithm; and an ordered list of one or more transformer applications; storing the configuration file in a standard format in the one or more non-transitory computer-readable storage devices; instantiating a streamliner application configured to read the configuration file; accessing the configuration file, using the streamliner application, to identify the one or more attributes defining the machine learning algorithm and the ordered list of the one or more transformer applications; running, using the streamliner application, each transformer application of the one or more transformer applications in an order determined by the ordered list of the one or more transformer applications; creating an output file, which can comprise the machine learning algorithm as defined by the one or more attributes in the configuration file; storing the output file in a standard format in the one or more non-transitory computer-readable storage devices; using the output file to run one or more machine learning applications.

Various embodiments include a method. The method can include creating a configuration file which can comprise: one or more attributes defining a machine learning algorithm; and an ordered list of one or more transformer applications; storing the configuration file in a standard format in the one or more non-transitory computer-readable storage devices; instantiating a streamliner application configured to read the configuration file; accessing the configuration file, using the streamliner application, to identify the one or more attributes defining the machine learning algorithm and the ordered list of the one or more transformer applications; running, using the streamliner application, each transformer application of the one or more transformer applications in an order determined by the ordered list of the one or more transformer applications; creating an output file, which can comprise the machine learning algorithm as defined by the one or more attributes in the configuration file; storing the output file in a standard format in the one or more non-transitory computer-readable storage devices; using the output file to run one or more machine learning applications.

Figure 2:
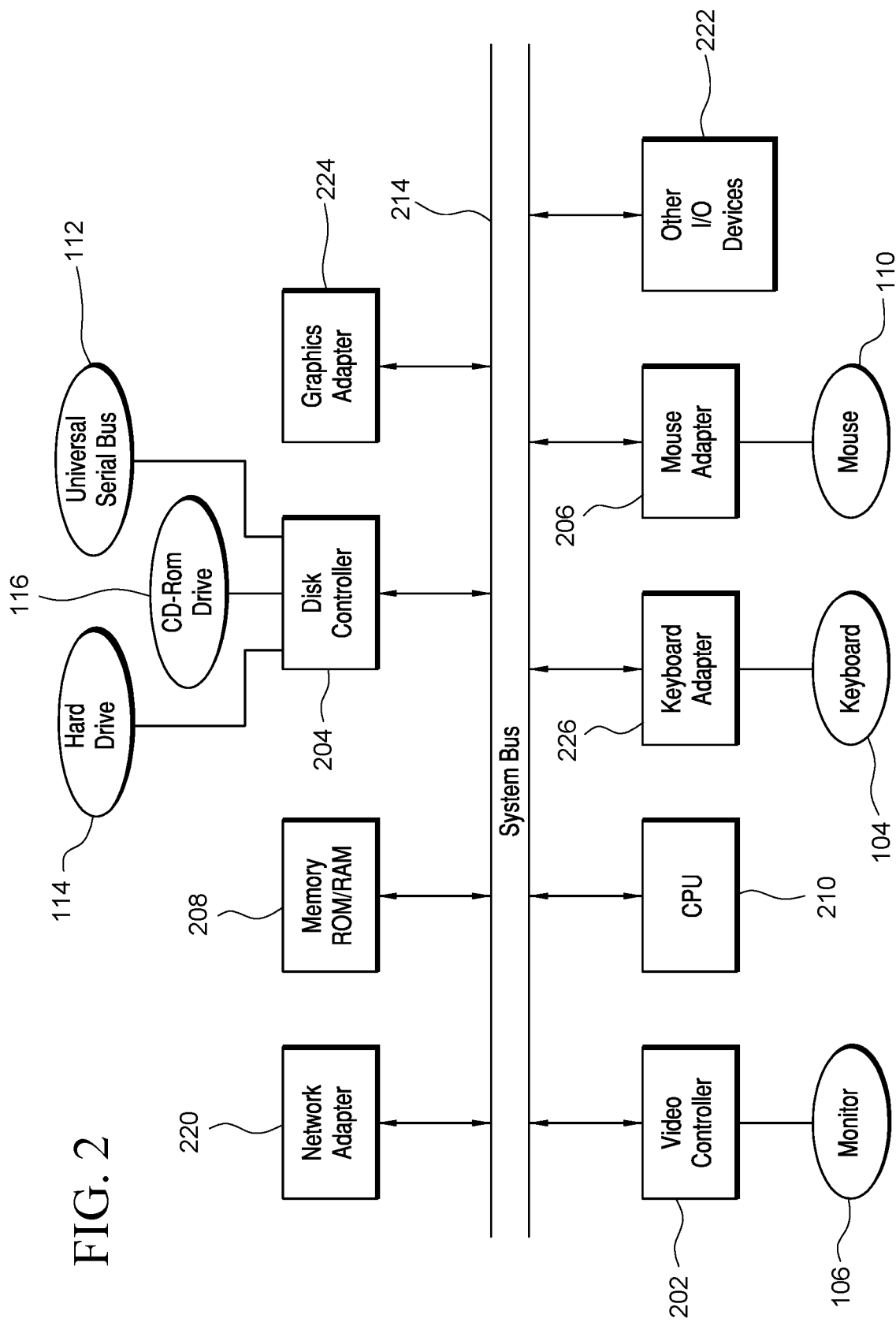
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
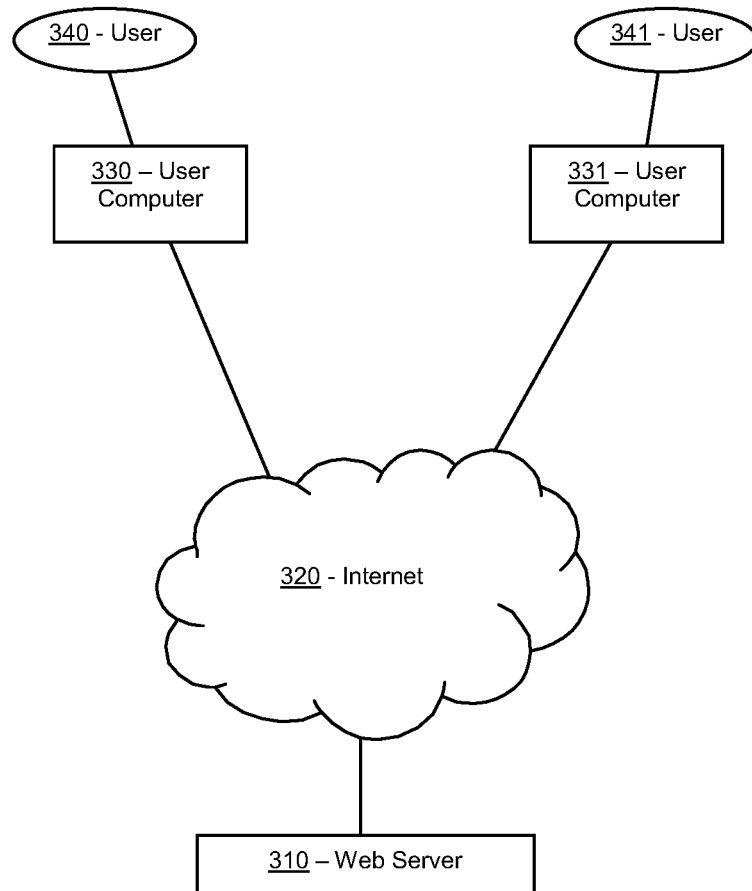
FIG. 3 illustrates a representative block diagram of a system, according to an embodiment.

Turning ahead in the drawings, FIG. 3 illustrates a block diagram of a system 300 that can be employed for a machine learning framework, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or an Internet 320. Web server 310 and/or internet 320 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or internet 320. Additional details regarding web server 310 and/or user internet 320 are described herein.

In many embodiments, system 300 also can comprise user computers 330, 331. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310, Internet 320, and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310, Internet 320, and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, Internet 320, and/or user computers 330, 331. In a similar manner, the processing module(s) and the memory storage module(s) can be local and/or remote to each other.

In many embodiments, web server 310 can be configured to communicate with one or more user computers 330, 331. In some embodiments, user computers 330, 331 also can be referred to as customer computers. In some embodiments, web server 310 can communicate or interface (e.g., interact) with one or more customer computers (such as user computers 330, 331) through a network or Internet 320. Internet 320 can be an intranet that is not open to the public. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 also can be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 340 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between and/or within web server 310, internet 320, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for easier and faster development of machine learning algorithms, as described in greater detail below. These techniques described herein can provide a significant improvement over conventional approaches of manually developing and managing machine learning models. In many embodiments, the techniques described herein can beneficially automatically develop machine learning algorithms based on dynamic information that describes current conditions and/or conditions that have occurred during a same day of a machine learning model being rolled out.

In many embodiments, the techniques described herein can be used continuously at a scale that cannot be handled using manual techniques. For example, a number of features managed by a machine learning framework can exceed a few thousand.

In a number of embodiments, the techniques described herein can solve a technical problem that arises only within the realm of computer networks, as online orders do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the machine learning model cannot be created without a computer.

Figure 4:
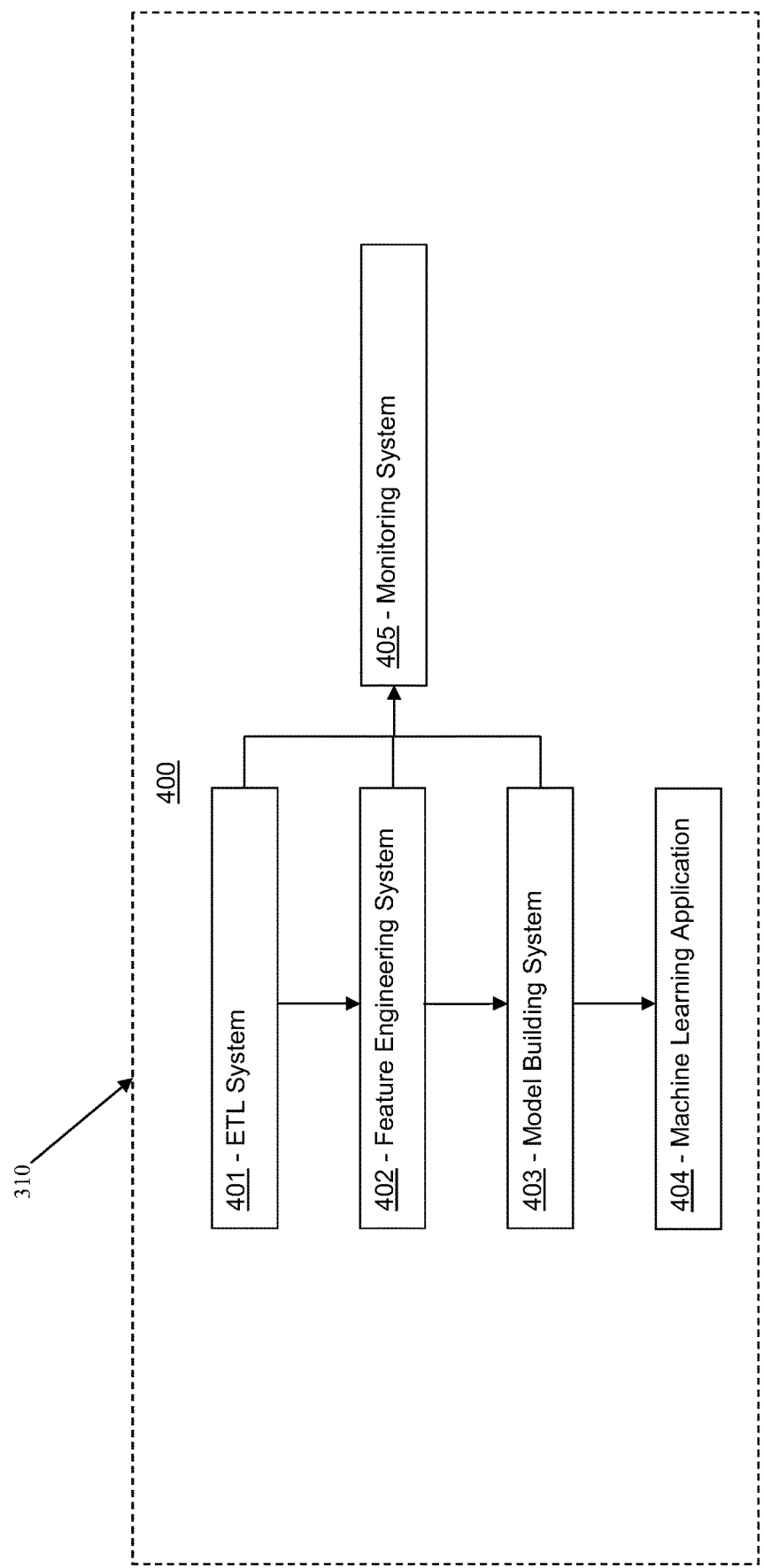
FIG. 4 illustrates a representative block diagram of a system, according to an embodiment.

Turning ahead in the drawings, FIG. 4 illustrates a block diagram of a web server 310 that can be employed for a machine learning framework, as described in greater detail below. System 400 is merely exemplary and embodiments of the system are not limited to the embodiments presented herein. System 400 can be employed in many different embodiments or examples not specifically depicted or described herein. In some embodiments, certain elements or modules of system 400 can perform various procedures, processes, and/or activities. In these or other embodiments, the procedures, processes, and/or activities can be performed by other suitable elements or modules of system 400.

Generally, therefore, system 400 and/or individual elements of system 400 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 400 described herein.

In many embodiments, system 400 can comprise an extraction, transform load ("ETL") system 401. In various embodiments, ELT system 401 can be a hardware and/or software module configured to perform ETL tasks on or within a database. For example, an ETL system can perform extraction tasks, transformation tasks, and/or load tasks. In some embodiments, an extraction task can comprise reading data from one or more databases. In various embodiments, a transform task can comprise converting extracted data into one or more different formats. The extracted data can be in many formats that are different from each other, and the ETL system can convert or transform those formats such that the output from the ETL system can be in a standard format or multiple standard formats. In the same or different embodiments, converting extracted data into one or more different formats can comprise using a lookup table, combining database (e.g., performing a join), and/or performing other operations on the data to convert it from one format to another. In various embodiments, a load task can comprise writing data into a database. In the same or different embodiments, an output of ETL system 401 can comprise raw feature data. In the same or different embodiments, raw feature data can comprise transactional data, production information data, interactional data, demographic data, and/or identity mapping data. IN many embodiments, an ETL layer can output an ETL output file comprising a text file, a sequence file, and/or a parquet file. In many embodiments, as noted above, raw feature data can be stored in a standard format. In some embodiments, a standard format can comprise a text file, a sequence file, and/or a parquet file, as described above. In various embodiments, an ETL system 401 can be configured to create a user identity mapping. In the same or different embodiments, a user identity mapping can comprise an identification of a specific user using online actions of a user, offline actions of a user, and/or demographics of a user. In many embodiments, online actions of a user can comprise online transactions, online marketing engagement e.g., opening an email or reading an electronic message), website interactions etc. In the same or different embodiments, offline interactions of a user can comprise in store purchases, real world marketing engagement (e.g., using a coupon sent through the postal service or handed out in store), location data, etc. In many embodiments, online actions of a user, offline actions of a user, and/or demographics of a user can be linked together using an identifier. In some embodiments, an identifier can comprise a phone number, an email address, payment information (e.g., credit card number, debit count number, etc.), an account name, and/or a unique identifier of an electronic device (e.g., IP address, MAC ID, SSAID, etc.).

In many embodiments, system 400 can comprise a feature engineering system 402. In the same or different embodiments, feature engineering system 402 can be a hardware and/or software module configured to convert raw feature data from ETL system 401 into a format that can be used by a model building system 403. In the same or different embodiments, feature engineering system 402 can be configured to perform method 700 (FIG. 7) as described in further detail below.

In many embodiments, system 400 can comprise a model building system 403. In the same or different embodiments, model building system 403 can be a hardware and/or software module configured to take an output from feature engineering system 402, and convert the output into a machine learning model, which is output from model building system 403. In the same or different embodiments, model building system 403 can perform method 800 (FIG. 8) as described in further detail below.

In many embodiments, system 400 can comprise a machine learning application 404. In the same or different embodiments, a machine learning application 404 can be a hardware and/or software module configured to run a machine learning model created by model building system 403. In various embodiments, a machine learning model can be used to perform a variety of activities related to predicting probabilities of future activities and/or actions. For example, a machine learning model can be used to understand natural human language, provide recommendations, aid in machine vision, identify handwriting, diagnose disease, etc.

In many embodiments, system 400 can comprise a monitoring system 405. In the same or different embodiments, monitoring system 405 can be a hardware and/or software module configured to monitor machine learning models built by model building system 403 and run by machine learning application 404. In various embodiments, monitoring system 405 can monitor real time performance of machine learning models built by model building system 403 and run by machine learning application 404, and provide feedback to system 400. This feedback can then be used to improve machine learning models built by model building system 403 and run by machine learning application 404. Monitoring system 405 also can receive input from ETL system 401 and feature engineering system 402, to be used in determining the feedback for system 400. In some embodiments, monitoring system 405 can visualize information comrpsing a distribution of predicted values and/or a number of instances with a certain predicted value. In the same or different embodiments, monitoring system 405 can be configured to report evaluation metrics, evaluate facts versus predictions, and other useful information and/or visualizations describing a performance of system 400.

Figure 5:
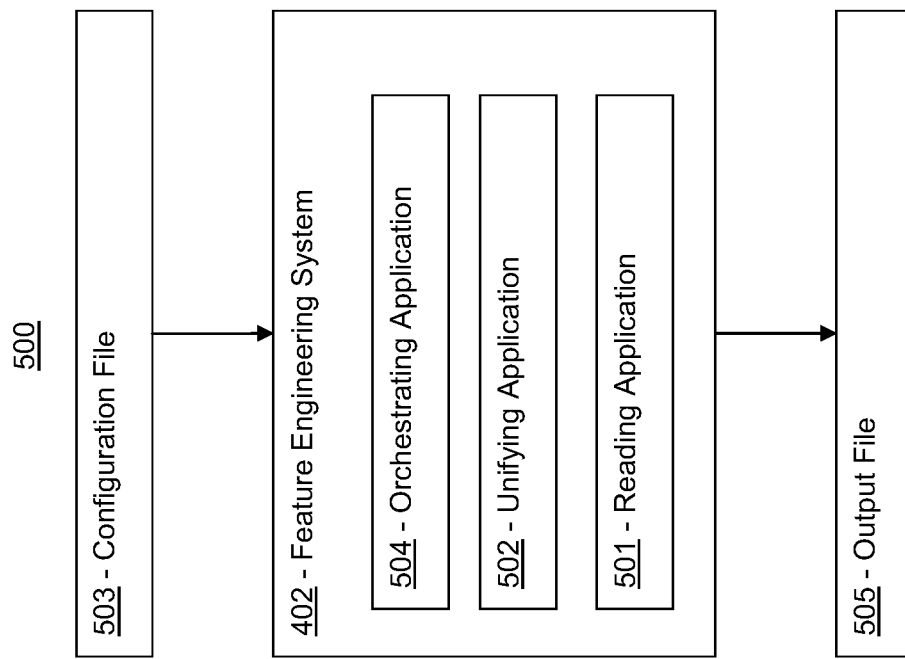
FIG. 5 illustrates a representative block diagram of a system, according to an embodiment.

Turning ahead in the drawings, FIG. 5 illustrates a block diagram of a system 500 that can be employed for a machine learning framework, as described in greater detail below. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In various embodiments, system 500 can perform method 700 (FIG. 7) as described in greater detail below. In these or other embodiments, the procedures, processes, and/or activities can be performed by other suitable elements or modules of system 500.

Generally, therefore, system 500 and/or individual elements of system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise a configuration file 503, feature engineering system 402, and an output file 505. Feature engineering system 402 can comprise a reading application 501 (also known as (AKA) a reader application). Generally speaking, a reading application 501 can comprise a hardware and/or software module configured to read and interpret an output of ETL system 401 (FIG. 4). In many embodiments, reading application 501 can be configured to access and read data stored and/or produced by an ETL system 401 (FIG. 4). In the same or different embodiments, reading application 501 can be configured to access data stored and/or produced by ETL system 401 by querying its file path (e.g., hdfs path). In many embodiments, querying a file path can comprise using a getPath method. In the same or different embodiments, a getPath method can comprise two different signatures. In embodiments where a getPath method comprises two different signatures, developers of reading application 501 can pass a set of input parameters to reading application 501, which can output a corresponding path for instance classes that inherit from the input parameters. In many embodiments, a first signature of a getPath method can transmit a date and/or epoch, a number of consequent days and/or epochs, a step (e.g., whether to move back or forward), and can return a set of paths in a form of a Unix path expression (e.g. {/path/to/data/date=20180101, /path/to/data/date=20180102, /path/to/data/date=20180103}). A second signature of a getPath method can transmit a start date and/or epoch, an end date and/or epoch, a step as described above, and can return a set of paths in a form of a Unix path expression. In various embodiments, a getPath method can append prefixes and/or suffixes to paths, as specified by a developer in a specific instance.

In many embodiments, querying a file path can comprise using a getDefaultPipeByConf method. In the same or different embodiments, a getDefaultPipeByConf method can transmit a configuration object from configuration file 503, and return a pipe (e.g, a data frame) with specified data. In many embodiments, a configuration object can comprise a start date and/or epoch, a duration, a direction, and/or a partition parameter. In the same or different embodiments, a configuration object can define specified data. In various embodiments, a getDefaultPipeByConf can use a getPath method, as described above, to find underlying paths, read the data from the underlying paths, and then loads the data from the underlying paths into a pipe. In many embodiments, when getDefaultPipeByConf reads content of underlying files from ETL layer 401, it can be configured to split each line according to a specified delimiter in an instance, and convert data to an appropriate data type according to data schema.

In some embodiments, reading application 501 can be configured to read different formats of outputs of ETL system 401 (e.g. text, sequence, and/or compressed files). In many embodiments, a reading application 501 can be configured to interpret one or more data types stored and/or produced by ETL system 401 by analyzing a schema of the data (e.g., by being able to analyze fields and their data types), using a delimiter used to separate fields, and/or analyzing partition information when data is partitioned.

In many embodiments, a reading application 501 can be configured to be customizable and transferrable between development of different machine learning models. In other words, a base/default reading application can be modified by a developer depending on a specific machine learning model that will be developed. In many embodiments, modifications to a reading application can comprises specifying a path to desired data, altering a delimiter used to separate fields, altering a partition field, and/or altering a schema of data. This modified reading application can then be saved on one or more non-transitory storage devices, and then be reused to create a similar machine learning model and/or a machine learning model that uses data found by a reading application. In this way, using a reading application can lessen coding time of a developer of a machine learning algorithm by removing the need to create a bespoke or customized reading application.

In many embodiments, feature engineering system 402 also can comprise a unifying application 502 (AKA a unifier application). Generally speaking, a unifying application 502 can be a hardware and/or software module configured to implement business logic required for building features. In many embodiments, a unifying application 502 can comprise a module in charge of implementing semantics of a feature. For example, when a developer wants to capture a user's transactions at a division level, ETL application 401 can provide a source for transactions of a user and a hierarchy/taxonomy of products. In this example, a reader application 501 can be instantiated to read transactional data, and another reader application 501 can be instantiated to read product hierarchy information. Here, a unifying application can be used to generate a user's transactions at a division level by joining transactional data and product hierarchy data on an item level, and then aggregating the results at division level.

In many embodiments, a unifying application 502 can be configured to perform a specific type of join (e.g., left, right, full, etc.) that should be used when joining different instances of a same unifier or joining different unifiers. In many embodiments, a unifying application 502 can be configured to specify a join field within a same unifier (e.g., a field that is used to join features collected from different time periods of a same unifier) or a join field to be used in joining different unifiers. In the same or different embodiments, a unifier can be configured to use a generateUnifiedPipe method. In various embodiments, a generateUnifiedPipe method can comprise taking a configuration object (e.g., start date, duration, direction, etc.) and return a pipe. In many embodiments, in order to avoid ambiguous column names, a developer of a unifying application 502 can add a name of a specific unifier concatenated with a name of a period of time from a configuration file 503, and use it as a column name. In many embodiments, a unifier can use an internal key to identify records and an external key to join with other unifying applications 502. Generally speaking, an internal key and/or an external key can function to aid in identifying records in data frames. For example, if a key is a user id, and a reading application reads one month of data, then the data can be aggregated at user id level using the key. In this way, there can be one record per user in the data frame, and each record can show an aggregated version of the user's activities (e.g. number of orders) over a one month period.

In many embodiments, a unifying application 502 can be configured to be customizable and transferrable between development of different machine learning models. In other words, a base/default unifying application can be modified by a developer depending on a specific machine learning model that will be developed. In many embodiments, modifications to a unifying application can comprise specifying an internal key, specifying an external keys, specifying a type of join (e.g., inner, left outer, full outer, etc.) to be used when joining unifying applications, logic to be implemented by a unifying application (e.g., a set of data transformation). This modified unifying application can then be saved on one or more non-transitory storage devices, and then be reused to create a similar machine learning model and/or a machine learning model that uses a same business logic. In this way, using a unifying application can lessen coding time of a developer of a machine learning algorithm by removing the need to create a bespoke or customized reading application.

In many embodiments, as noted above, system 500 can comprise configuration file 503 (AKA a config file). Generally speaking, a configuration file can comprise a hardware and/or software module configured to identify features needed in a machine learning algorithm and a time period from which the features will be collected. In many embodiments, a time period can comprise 1 day, 2 days, 3 days, 4 days, 5 days, 10 days, 20 days, 1 month, 2 months, 3 months, 4 months, 5 months, 6 months, 9 months, 1 year, 2 years, 3 years, 4 years, 5 years, etc. In many embodiments, a configuration file 503 can comprise a list of unifying applications that are needed for generation of a specific machine learning algorithm. In the same or different embodiments, a configuration file can comprise a list of time periods from which features should be collected. For example, a configuration file can be configured to instruct a unifying application to collect transactions at a division level for each customer, and then break them into periods of 3 months for the preceding 12 months. In various embodiments, a configuration file can comprise a number of distinct fields where unifying applications, features, and/or time periods can be specified. For example, FIG. 11 displays an exemplary embodiment of a configuration file. As can be seen in FIG. 11, a unifier named "EmailRecipientUnifier" is listed, which is configured to collect a number of emails received by users. As can be seen in FIG. 11, this embodiment of a unifier states that statistics for each user will be collected over two time periods. One time period comprises a 6 day period (represented by "1") and another time period comprises an 89 day period (represented by "quarter1").

Returning to FIG. 5, in many embodiments, a configuration file 503 can be configured to be customizable and transferrable between development of different machine learning models. In other words, a base/default unifying application can be modified by a developer depending on a specific machine learning model that will be developed. In many embodiments, modifications to a configuration file can comprise modifying one or more fields of the configuration file as described further within this document. This modified configuration file can then be saved on one or more non-transitory storage devices, and then be reused to create a similar machine learning model and/or a machine learning model that uses a same set of unifiers and feature data. In this way, using a configuration file can lessen coding time of a developer of a machine learning algorithm by removing the need to create a bespoke or customized set of specifications for creation of a machine learning model.

Returning now to FIG. 5, in many embodiments, feature engineering system 402 also can comprise an orchestrating application 504 (AKA an orchestrator). Generally speaking, an orchestrating application 504 can comprise a hardware and/or software module configured to instantiate, access, and/or run other elements of system 500. In many embodiments, an orchestrating application can be configured read a configuration file and generate features based on parameters written within the configuration file by an administrator. In the same or different embodiments, an orchestrating application can read a configuration file and create a list of tuples. In many embodiments, each tuple of a list of tuples can describe a Unifier and/or a list of config objects (e.g. start date, duration, and name). In some embodiments, an orchestrating application can be configured to read an identity mapping provided by ETL later 401, and use this identity mapping to create features. In various embodiments, an orchestrating application can be configured to group unifying applications of a same group into categories based on an identity field. In the same or different embodiments, an orchestrating application can be configured to join unifying applications across different groups using an identity mapping provided by ETL later 401.

As an example, in one embodiment there can be three unifying applications in a configuration file: one unifying application determining a number of emails users receive, a second unifying application determining a number of emails opened by the users, and a third unifying application determining division level transactions made by users. In this example, the first unifying application and the second unifying application can use an email address as an attribute value in an identity field, and the third unifying application can use a user id as an attribute value in an identity field. Here, the orchestrating application can place the first unifying application and the second unifying application in a same group based on the same attribute value in the respective identity fields, and the third unifying application in a different group. The orchestrating application can then join the first unifying application and the second unifying application at the email address field to create a combination unifying application, and can join this combination unifying application with the third unifying application using the identity mapping (e.g., by mapping user ids in the third unifying application to the corresponding email addresses using the identity mapping information).

In many embodiments, an orchestrating application can be configured to instantiate appropriate unifying applications based upon a list of unifying applications in a configuration file. In the same or different embodiments, an orchestrating application loads unifying applications using Reflection, a programming technique to create, modify, and invoke methods on objects at run time.

In many embodiments, as noted above, system 500 can comprise output file 505. In the same or different embodiments, an output file can comprise a hardware and/or software module created by feature engineering system 402 (FIG. 4) and configured to be read by a model building system 403 (FIG. 4). In various embodiments, an output file can comprise feature data. In many embodiments, feature data in an output file can be stored in a standardized format. In some embodiments, feature data in an output file can be atomic (e.g., feature data comprising a single value) or can comprise a list of values. In embodiments where feature data comprises a list of values, the feature data can be encapsulated into a conceptual feature, thereby keeping a number of output features smaller. In many embodiments, an output file can be stored in a standard format, and can be stored as a sparse representation for list features. Storage efficiency can be improved by encapsulating feature vectors into coarser, conceptual feature vectors by utilizing sparse representation. As an example, instead of having a plurality of feature vectors representing a number of orders in different departments for a user, these feature vectors can be grouped into one conceptual feature vector that represents orders in the different departments. In some embodiments, a sparse representation of a feature vector can store only non-zero counts for features in the feature vector. Therefore, continuing with the above referenced example, when a user makes purchases only in a small number of departments rather than a large number of departments, many counts in a conceptual feature can be zero, and therefore not stored in the sparse representation of the feature vector.

As another example, in one embodiment, a marketplace comprises 170 departments at a retailer, and customers' transactions are collected at monthly level. It is unlikely that a customer shops across all 170 departments in the same month. On the contrary, an average customer may shop in only one of two of these departments on a monthly basis. If sparse representation is not used, in order to store the number of transactions a customer makes in a given month, 170 values need to be stored, most of which are zero and only a few of which are greater than zero. The sparse representation makes it possible to store the non-zero values only, instead of storing everything (including all of the zeros) to reduce significantly the size of the output. Using a sparse representation, then, can reduce required storage space, and can consequently make subsequent reading and/or processing of the sparse representation of the feature vector faster than reading and/or processing of one or more feature vectors that are zeros. In many embodiments, a sparse representation of a feature vector can be stored in a database as described above. Further, storing an output file using a sparse representation can minimize a file size of the output file, a processing time required to read the output file, and a portability of the output file. This sparse representation can be in a standard format.

Figure 6:
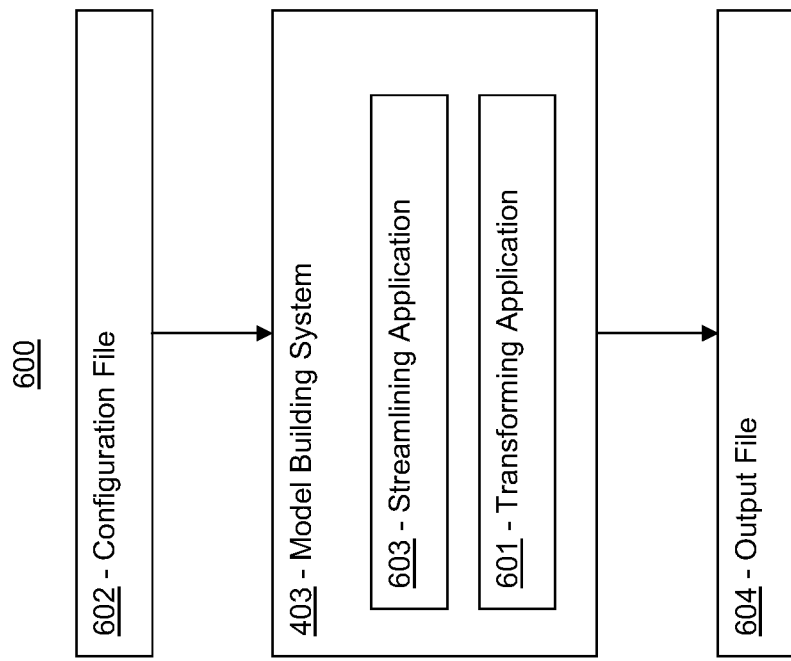
FIG. 6 illustrates a representative block diagram of a system, according to an embodiment.

Turning ahead in the drawings, FIG. 6 illustrates a block diagram of a system 600 that can be employed for a machine learning framework, as described in greater detail below. System 600 is merely exemplary and embodiments of the system are not limited to the embodiments presented herein. System 600 can be employed in many different embodiments or examples not specifically depicted or described herein. In some embodiments, certain elements or modules of system 600 can perform various procedures, processes, and/or activities. In various embodiments, system 600 can perform method 800 (FIG. 7) as described in greater detail below. In these or other embodiments, the procedures, processes, and/or activities can be performed by other suitable elements or modules of system 600.

Generally, therefore, system 600 and/or individual elements of system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise a configuration file 602, model building system 403, and an output file 604. Model building system 403 can comprise a transforming application 601 (AKA a transformer). Generally speaking, a transformer application 601 can comprise a hardware and/or software module configured to transform feature data produced by feature engineering system 402. In the same or different embodiments, a transformer application can be configured to filter feature data, standardize features, sample, build models, scoring users, and/or evaluating models. In many embodiments, filtering feature data can comprise filtering by a number of orders made on an eCommerce website. In various embodiments, standardizing features can comprise subtracting a mean value of a feature from a specific value of a feature, and divide a standard deviation of a feature to make a range of different features closer to each other. In some embodiments, sampling can comprise keeping one or more training instances (e.g., a user's feature values) with a label of one and down sampling training instances with a label of 0 to make a training set balanced (i.e. make a ratio of training instance with a label 1 and 0 the same or similar). In many embodiments, building models can comprise training a logistic regression model on a training set to translate a user feature vector into a probability score that represents a probability of opening a message by that user. In the same or different embodiments, scoring users can comprise providing a user's feature vector as an input argument to a logistic regression model, and getting a probability of opening a message by the user as an output. In many embodiments, evaluating models can comprise using a model to calculate a probability of opening a message by a user, sending the user a message, waiting for a certain period of time, collecting data, checking whether the user has opened the message or not, comparing this factual data against a the prediction and determining how accurately the model was able to predict the user's actions (in this case opening a message).

In many embodiments, a transforming application can be configured to take feature data as input and convert it to another data format. In some embodiments, transforming applications can be re-used across development of different machine learning algorithms and/or stored in a library of transformer applications, thereby making development of iterative machine learning algorithms faster, as compared with the prior art, while requiring minimal coding time by a developer. Use of transformer applications can also makes a code base for a machine learning framework concise and easier to maintain.

In many embodiments, as noted above, system 600 can comprise configuration file 602 (AKA a config file). In various embodiments, a configuration 602 can be a same or different configuration file than configuration file 503 (FIG. 5). Generally speaking, a configuration file 602 can comprise a hardware and/or software module configured to allow an administrator and/or developer to specify settings such as a schema of feature data and/or transformations that can be applied to the feature data. In various embodiments, a configuration file can comprise one or more fields, which are described in further detail below. In the same or different embodiments, alteration of one or more fields of a configuration file can change a machine learning model developed by system 600. An exemplary configuration file is shown in FIG. 12, which displays the one or more fields and values of those fields.

Returning to FIG. 6, in some embodiments, a configuration file 602 can be configured to identify training schema. In many embodiments, training schema can comprise specifying a schema of feature data used to build and/or train a machine learning model. For training example, a schema can comprise a user id, a number of emails received between 60 to 30 days ago, a number of emails between over 60 to 30 days ago, a number of emails clicked between 60 to 30 days ago, a number of days since a user has opted in to receive messages, age of a user, gender of a user, education level of a user, a field representing whether the user has opened a marketing message in the last 30 days, etc.

In many embodiments, a configuration file 602 can be configured to identify testing schema. In some embodiments, testing schema can comprise specifying a schema of feature data used for scoring purposes. For example, a testing schema can comprise a user id, a number of emails received between 60 to 30 days ago, a number of emails between over 60 to 30 days ago, a number of emails clicked between 60 to 30 days ago, a number of days since a user has opted in to receive messages, age of a user, gender of a user, education level of a user, a field representing whether the user has opened a marketing message in the last 30 days, etc.

In various embodiments, a configuration file 602 can be configured to identify a feature schema. In many embodiments, a feature schema can comprise a subset of a training schema and/or a testing schema. For example, a number of emails received between 60 to 30 days ago, a number of emails opened between 60 to 30 days ago, and/or a number of emails clicked over 60 to 30 days ago In the same or different embodiments, a configuration file 602 can be configured to identify a key. In various embodiments, a key can comprise a subset of a training schema and/or a testing schema. For example, a key can be a user ID.

In some embodiments, a configuration file 602 can be configured to identify a label. In many embodiments, a label can comprise a subset of a training schema and/or a testing schema. In various embodiments, a label can comprise a feature of training schema and/or testing schema that is to be predicted by a machine learning model. For example, a field representing whether the user has opened a message in the last 30 days.

In many embodiments, a configuration file 602 can be configured to identify a synthetic feature. In some embodiments, a synthetic feature can comprise a feature that can be generated as a function of existing features. For example, when training data comprises a number of received emails and a number of opened emails, a synthetic feature of open rate can be determined by dividing a number of opened emails by a number of received emails.

In various embodiments, a configuration file 602 can be configured to identify a categorical feature, In many embodiments, a categorical feature can comprise a subset of a feature and/or a synthetic feature. In some embodiments, a categorical feature can comprise a feature whose value can be categorical. For example, a gender of a user and/or an education level of a user.

In the same or different embodiments, a configuration file 602 can be configured to identify a model type. In various embodiments, a model type can comprise an identification of a type of model to be built by system 600. In many embodiments, an identification of a type of model to be built can comprise an identification of model hyper parameters. In many embodiments, hyper parameters can comprise parameters with values that are set before training a model, as opposed to other parameter values that can be derived via the training process. For example, hyper parameters can comprise a learning rate in a logistic regression algorithm and/or a number of trees in a random forest algorithm.

In some embodiments, a configuration file 602 can be configured to identify a transformer flow. In the same or different embodiments, a transformer flow can comprise an ordered list of transforming applications. In various embodiments, an ordered list of transforming applications can determine an order in which transforming applications are instantiated by a streamlining application, as described in further detail below. For example, in embodiments where a machine learning model is built to predict a message open rate for a user, a transformer flow can comprise a transformer to sample data, standardize input features, and build a model.

When compared with past methods of developing a machine learning model, using a configuration file can make this process faster and more convenient for a developer. Adding and/or removing new features and using a resulting set of features to build models can be as simple as modifying a "features" field in a configuration file, as opposed to spending hours developing bespoke, customized applications to do the same thing. This improvement, then, can enable a developer to try different models comprising different tunings with very little effort (e.g., by merely modifying fields in a configuration file). Further, configuration files can be reusable and, therefore, can be easily applied to multiple different projects. For example, in an embodiment where training data comprises features of a number emails received, a number emails opened, and a number emails clicked, the same configuration file can be used to build a first machine learning model predicting an open rate and a second machine learning model predicting a click rate. A developer can simply alter a "label" field in the first configuration file from open rate to click rate to produce the second machine learning model.

In many embodiments, model building system 403 also can comprise a streamlining application 603 (AKA a streamliner). Generally speaking, a streamlining application can comprise a hardware and/or software module configured to read a configuration file 602, instantiate transforming applications, and then execute the transforming applications according to an order listed in a transformer flow. In various embodiments, a streamlining application can be configured to extract keys, features, and labels from input data (e.g. a configuration file 603 and/or an output file 505 (FIG. 5)), as well as to generate synthetic features when they synthetic features are described in a configuration file 602. In some embodiments, a streamlining application 603 can be similar to an orchestrating application 504 (FIG. 5) in that a streamlining application can enable a developer to decouple building blocks of a machine learning algorithm from its development. In this way, code sharing can be encouraged and facilitated by system 600. In the same or different embodiments, a streamlining application can use a reflection method, as described above, to instantiate transformer applications. In various embodiments, a streamlining application can instantiate transformer applications in an order specified in a transformer flow of a configuration file. Therefore, in these embodiments, data can be passed from one transformer application to a next transformer application in the order specified in the transformer flow of the configuration file. In other words, in some embodiments, an output of one transformer application can be an input to the next transformer application.

In many embodiments, as noted above, system 600 can comprise output file 604. Generally speaking, output file 604 can comprise a hardware and/or software module configured to be run on a machine learning application 404. In many embodiments, an output file 604 can be created by a transformer application. In the same or different embodiments, an output file 604 can be created by a last transformer application in a transformer flow.

Figure 7:
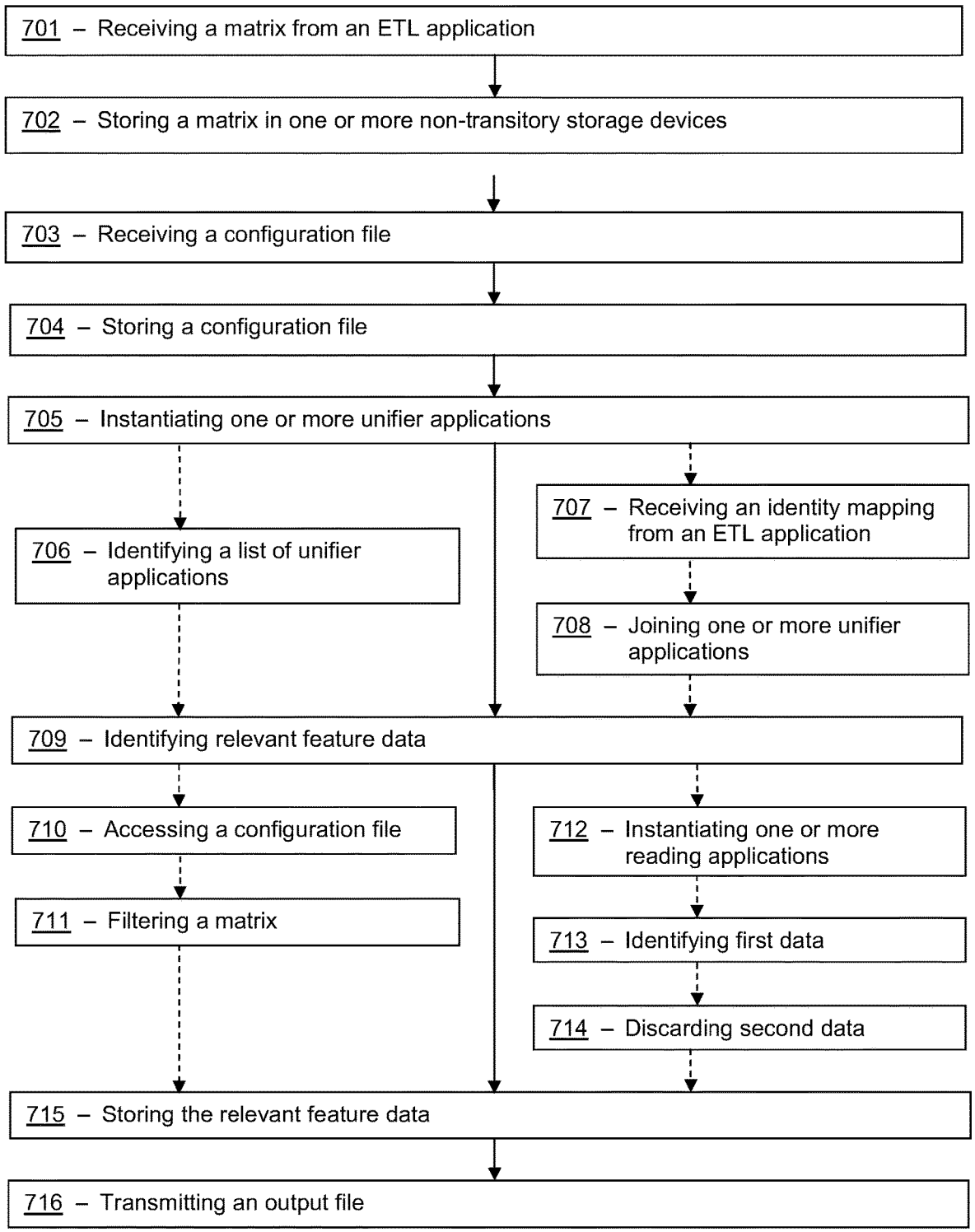
FIG. 7 illustrates a flowchart for a method, according to certain embodiments.

Turning ahead in the drawings, FIG. 7 illustrates a flow chart for a method 700, according to an embodiment. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIG. 3) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules. Such non-transitory memory storage modules can be part of a computer system such as system 100 (FIG. 1). The processing module(s) can be similar or identical to the processing module(s) described above with respect to computer system 100 (FIG. 1).

In many embodiments, method 700 can comprise an activity 701 of receiving a matrix from an ETL application. In various embodiments, the ETL application can comprise ETL system 401 (FIG. 4). In some embodiments, activity 701 can be performed by system 500 (FIG. 5). In more particular embodiments, activity 701 can be performed by reading application 501 (FIG. 5) and/or an orchestrating application 504 (FIG. 5). In the same or different embodiments, a matrix can comprise raw feature data as produced by ETL system 401 (FIG. 4).

Next, in many embodiments, method 700 can comprise an activity 702 of storing a matrix in one or more non-transitory storage devices. In some embodiments, activity 702 can be performed by system 500 (FIG. 5). In more particular embodiments, activity 702 can be performed by orchestrating application 504 (FIG. 5). In the same or different embodiments, a matrix can comprise raw feature data stored in a standard format, as described above with reference to ETL system 401.

Then, in many embodiments, method 700 can continue by comprising an activity 703 of receiving a configuration file. In some embodiments, activity 703 can be performed by system 500 (FIG. 5). In more particular embodiments, activity 703 can be performed by orchestrating application 504 (FIG. 5). In various embodiments, a configuration file can comprise configuration file 503 as described above. In some embodiments, a configuration can be received over a computer network, such as system 300 (FIG. 3).

In many embodiments, method 700 can continue further by comprising an activity 704 of storing a configuration file. In some embodiments, activity 704 can be performed by system 500 (FIG. 5). In more particular embodiments, activity 704 can be performed by orchestrating application 504 (FIG. 5). In many embodiments, a configuration file can be stored on one or more non-transitory storage devices as described with regards to system 100 (FIG. 1). In some embodiments, a configuration file can be stored in a standard format, such as a format described with reference to configuration file 503 and/or shown in FIG. 11.

Next, in many embodiments, method 700 can comprise an activity 705 of instantiating one or more unifier applications. In some embodiments, activity 705 can be performed by system 500 (FIG. 5). In more particular embodiments, activity 705 can be performed by orchestrating application 504 (FIG. 5). In the same or different embodiments, one or more unifier applications can be instantiated based upon a configuration file, as described with reference to configuration file 503 (FIG. 5).

After activity 705, in many embodiments, method 700 can optionally comprise an activity 706 of identifying a list of unifier applications. In some embodiments, activity 706 can be performed by system 500 (FIG. 5). In more particular embodiments, activity 706 can be performed by orchestrating application 504 (FIG. 5).

Also after activity 705, in many embodiments, method 700 can optionally comprise an activity 707 of receiving an identity mapping from an ETL application. In some embodiments, activity 707 can be performed by system 500 (FIG. 5). In more particular embodiments, activity 707 can be performed by unifying application 502 (FIG. 5) and/or an orchestrating application 504 (FIG. 5). In many embodiments, an ETL application can comprise ETL system 401 (FIG. 4), and an identity can be the same or different than an identity mapping described with reference to ETL system 401 (FIG. 4).

In many embodiments, method 700 can continue after activity 707 by comprising an activity 708 of joining one or more unifier applications. In some embodiments, activity 708 can be performed by system 500 (FIG. 5). In more particular embodiments, activity 708 can be performed by orchestrating application 504 (FIG. 5). In some embodiments, an identity mapping can be used to join one or more unifier applications, as described above. In many embodiments, joining one or more unifier applications can identify a user, as described above.

In many embodiments, method 700 also can comprise an activity 709 of identifying relevant feature data. In some embodiments, activity 709 can be performed by system 500 (FIG. 5). In more particular embodiments, activity 709 can be performed by reading application 501 (FIG. 5), unifier application 502 (FIG. 5), and/or orchestrating application 504 (FIG. 5). In many embodiments, relevant feature data can comprise a portion of data received from ETL system 401. Activity 709 can occur after activity 705, and also can occur after activity 706 (if performed) and/or after activities 707 and 708 (if performed).

After activity 709, in many embodiments, method 700 can comprise an optional activity 710 of accessing a configuration file. In some embodiments, activity 710 can be performed by system 500 (FIG. 5). In more particular embodiments, activity 710 can be performed by reading application 501 (FIG. 5), unifier application 502 (FIG. 5), and/or orchestrating application 504 (FIG. 5). In many embodiments, a configuration file can comprise configuration file 503. In the same or different embodiments, a configuration file can be accessed to identify a start date, a direction, and/or a duration. In various embodiments, a start date, a direction, and/or a duration can be the same or different than a start date, a direction, and/or a duration described with reference to configuration file 503.

In many embodiments, method 700 can continue after activity 710 by comprising an activity 711 of filtering a matrix. In some embodiments, activity 711 can be performed by system 500 (FIG. 5). In more particular embodiments, activity 711 can be performed by reading application 501 (FIG. 5), unifier application 502 (FIG. 5), and/or orchestrating application 504 (FIG. 5). In various embodiments, a matrix can be filtered based upon a start date, a direction, and/or a duration such that only entries in the matrix comprising the start date, the direction, and/or the duration remain in the matrix. In mane embodiments, a start date, a direction, and/or a duration can be the same or different than a start date, a direction, and/or a duration described with reference to configuration file 503.

Also after activity 709, in many embodiments, method 700 can comprise an optional activity 712 of instantiating one or more reading applications. In various embodiments, one or more reading applications can comprise reading application 501. In some embodiments, activity 712 can be performed by system 500 (FIG. 5). In more particular embodiments, activity 712 can be performed by orchestrating application 504 (FIG. 5). In the same or different embodiments, one or more reading applications can be instantiated based upon a configuration file, as described with reference to configuration file 503 (FIG. 5).

In many embodiments, method 700 can continue after activity 712 by comprising an activity 713 of identifying a first data. In some embodiments, activity 713 can be performed by system 500 (FIG. 5). In more particular embodiments, activity 713 can be performed by orchestrating application 504 (FIG. 5). In the same or different embodiments, a first data can comprise a subset of raw feature data as provided by ETL system 401 (FIG. 4). In various embodiments, first data can comprise a first type of raw feature data, as described with reference to reading application 501.

In many embodiments, method 700 can continue after activity 703 by comprising an activity 714 of discarding second data. In some embodiments, activity 714 can be performed by system 500 (FIG. 5). In more particular embodiments, activity 714 can be performed by orchestrating application 504 (FIG. 5). In various embodiments, second data can comprise a portion of the raw feature data not comprising first data.

In many embodiments, method 700 also can comprise an activity 715 of storing relevant feature data. In some embodiments, activity 715 can be performed by system 500 (FIG. 5). In more particular embodiments, activity 715 can be performed by orchestrating application 504 (FIG. 5). In various embodiments, relevant feature data can be stored in an output file. In the same or different embodiments, an output file can comprise output file 505. In many embodiments, relevant feature data can be stored in a standardized format, as described with reference to output file 505. Activity 715 can occur after activity 709, and also can occur after activities 710 and 711 (if performed) and/or after activities 712, 713, and 714 (if performed).

In many embodiments, activity 705 can further comprise modifying a configuration file. In some embodiments, a configuration file can comprise configuration file 503, and modifying it can comprise altering, deleting, changing, and/or adding a new field in the configuration file. In various embodiments, a reading application 501, a unifying application 502, and/or an orchestrating application 504 can be modified instead of or in addition to a configuration file. In these embodiments, modifying a reading application 501, a unifying application 502, and/or an orchestrating application 504 can comprise altering, deleting, changing, and/or adding one or more fields in the streamlining application and/or transforming application.

In many embodiments, activity 705 can further comprise using a second configuration file to create a second machine learning algorithm. In some embodiments, a second reading application, a second unifying application, and/or a second orchestrating application can be used instead of or in addition to a second configuration file. In various embodiments, creating a second machine learning algorithm can comprise using method 700 with a second configuration file, a second reading application, a second unifying application, and/or a second orchestrating application.

After activity 715, in many embodiments, method 700 can comprise an activity 716 of transmitting an output file. In some embodiments, activity 716 can be performed by system 500 (FIG. 5). In more particular embodiments, activity 716 can be performed by orchestrating application 504 (FIG. 5). In many embodiments, an output file can be the same or different than output file 505. In the same or different embodiments, an output file can be transmitted over a computer network in real time so that a model building system can have up to date information. In many embodiments, a computer network can comprise system 300 (FIG. 3), as described above. In some embodiments, a model building system can comprise model building system 403.

Figure 8:
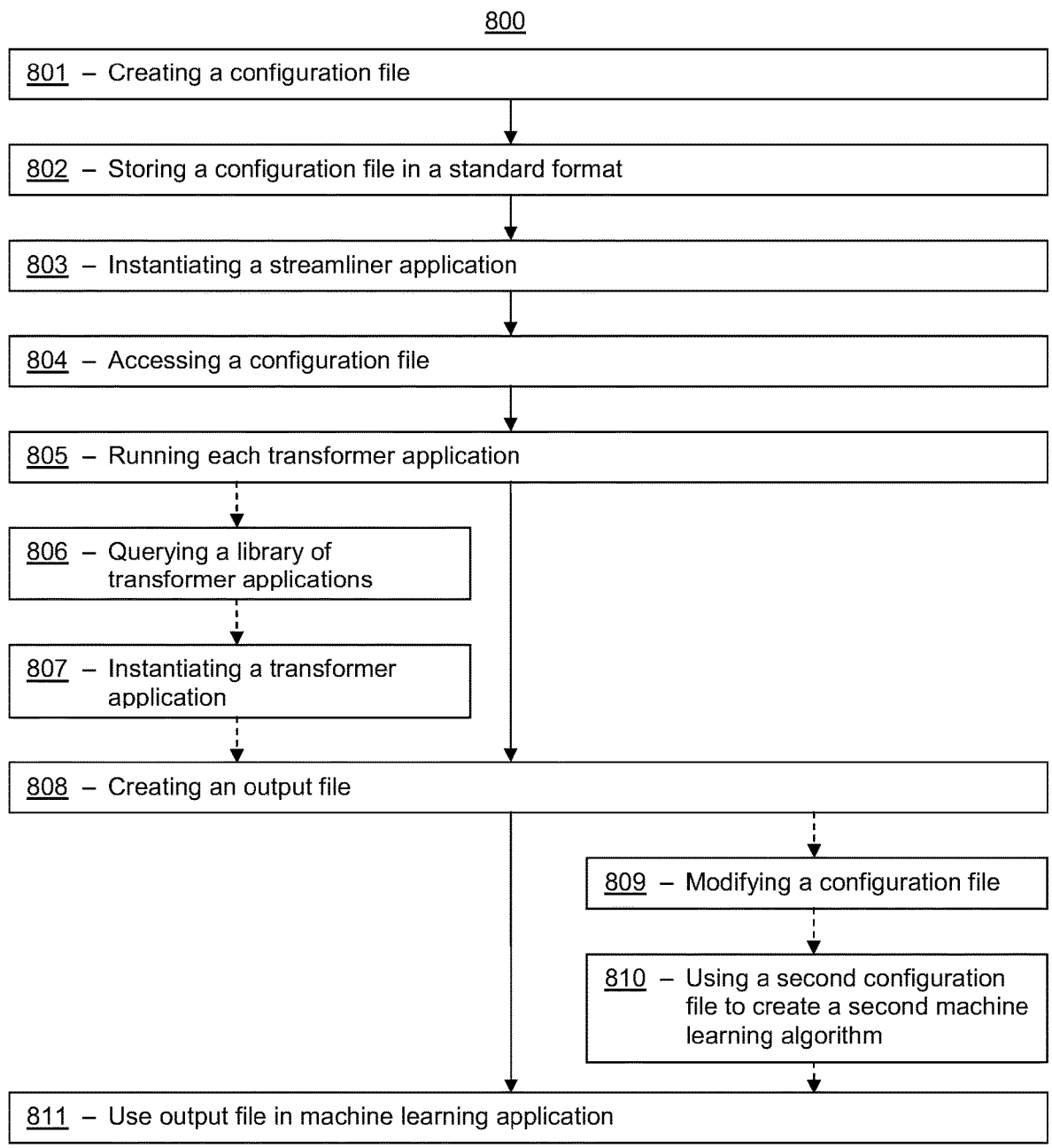
FIG. 8 illustrates a flowchart for a method, according to certain embodiments.

Turning ahead in the drawings, FIG. 8 illustrates a flow chart for a method 800, according to an embodiment. Method 800 is merely exemplary and is not limited to the embodiments presented herein. Method 700 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIG. 3) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 100 (FIG. 1). The processing module(s) can be similar or identical to the processing module(s) described above with respect to computer system 100 (FIG. 1).

In many embodiments, method 800 can comprise an activity 801 creating a configuration file. In various embodiments, a configuration file can comprise configuration file 602 (FIG. 6) and/or the text of a configuration file shown in FIG. 12. Returning to FIG. 8, in some embodiments, activity 801 can be performed by system 600 (FIG. 6) or an administrator of system 600 (FIG. 6). In the same or different embodiments, a configuration file can comprise one or more attributes defining a machine learning algorithm and/or an ordered list of one or more transformer applications, as described with reference to configuration file 602 (FIG. 6). In various embodiments, a transformer application can comprise transforming application 601 (FIG. 6). In many embodiments, one or more attributes defining a machine learning algorithm can comprise training schema, testing schema, model parameters, at least one feature of the training schema, at least one feature of the testing schema, a key of the training schema, a key of the testing schema, a label of the training schema at least one new feature created using the at least one feature of the training schema, at least one new feature created using the at least one feature of the testing schema, at least one categorical feature of the at least one feature of the training schema, and/or at least one categorical feature of the at least one feature of the testing schema, a label of the testing schema as described with reference to configuration file 602 (FIG. 6).

In many embodiments, method 800 can continue by comprising an activity 802 of storing a configuration file in a standard format. In the same or different embodiments, a configuration file can comprise configuration file 602 (FIG. 6) and/or the text of a configuration file shown in FIG. 12. Returning to FIG. 8, in the same or different embodiments, a standard format can comprise a format of a configuration file as described with reference to configuration file 602 (FIG. 6) and shown in FIG. 12.

Returning to FIG. 8, in many embodiments, method 800 can continue by comprising an activity 803 of instantiating a streamliner application. In some embodiments, activity 803 can be performed by system 600 (FIG. 6) or an administrator of system 600 (FIG. 6). In the same or different embodiments, a streamliner application can comprise streamliner application 603 (FIG. 6). The streamline application can be configured to read the configuration file.

Then, in many embodiments, method 800 can comprise an activity 804 of accessing a configuration file. In various embodiments, activity 804 can be performed by streamlining application 603 (FIG. 6). In the same or different embodiments, a configuration file can comprise the configuration file as described with reference to configuration file 602 (FIG. 6) and/or the text of a configuration file shown in FIG. 12.

Returning to FIG. 8, in many embodiments, method 800 can continue by comprising an activity 805 of running each transformer application. In the same or different embodiments, activity 805 can be performed by streamlining application 603 (FIG. 6). In various embodiments, each transformer application can comprise a separate one of transforming application 601 (FIG. 6). In many embodiments, a transformer application can comprise a filtering transformer application, a standardizing transformer application, a sampling transformer application, a model building transformer application, a scoring transformer application, and/or a model evaluating transformer application.

After activity 805, in many embodiments, method 800 can optionally comprise an activity 806 of querying a library of transformer applications. In some embodiments, activity 806 can be performed by streamlining application 603 (FIG. 6). In the same or different embodiments, a transformer application can comprise transforming application 601 (FIG. 6) as descried above.

In many embodiments, method 800 can continue after activity 806 by optionally comprising instantiating transformer application 807. In some embodiments, activity 807 can be performed by streamlining application 603 (FIG. 6). In the same or different embodiments, a transformer application can comprise transforming application 601 (FIG. 6) as descried above.

In many embodiments, method 800 also can comprise creating an output file 808. In some embodiments, activity 808 can be performed by transforming application 601 (FIG. 6) and/or streamlining application 603 (FIG. 6). In the same or different embodiments, an output file can comprise output file 604 (FIG. 6) as described above. Activity 808 can occur after activity 805, and also can occur after activities 806 and 807 (if performed).

In many embodiments, method 800 can comprise an activity 809 of modifying a configuration file. In some embodiments, a configuration file can comprise configuration file 602, and modifying it can comprise altering, deleting, changing, and/or adding a new field in the configuration file. In various embodiments, a streamlining application and/or a transforming application can be modified instead of or in addition to a configuration file. In these embodiments, modifying a transforming application and/or a streamlining application can comprise altering, deleting, changing, and/or adding one or more fields in the streamlining application and/or transforming application.

In many embodiments, method 800 can comprise an activity 810 of using a second configuration file to create a second machine learning algorithm. In some embodiments, a second streamlining application and/or a transforming application can be used instead of or in addition to a second configuration file. In various embodiments, creating a second machine learning algorithm can comprise using method 800 with a second configuration file, second streamlining application, and/or a second transforming application.

In several embodiments, method 800 can comprise an activity 811 of using an output file in a machine learning application.

Figure 9:
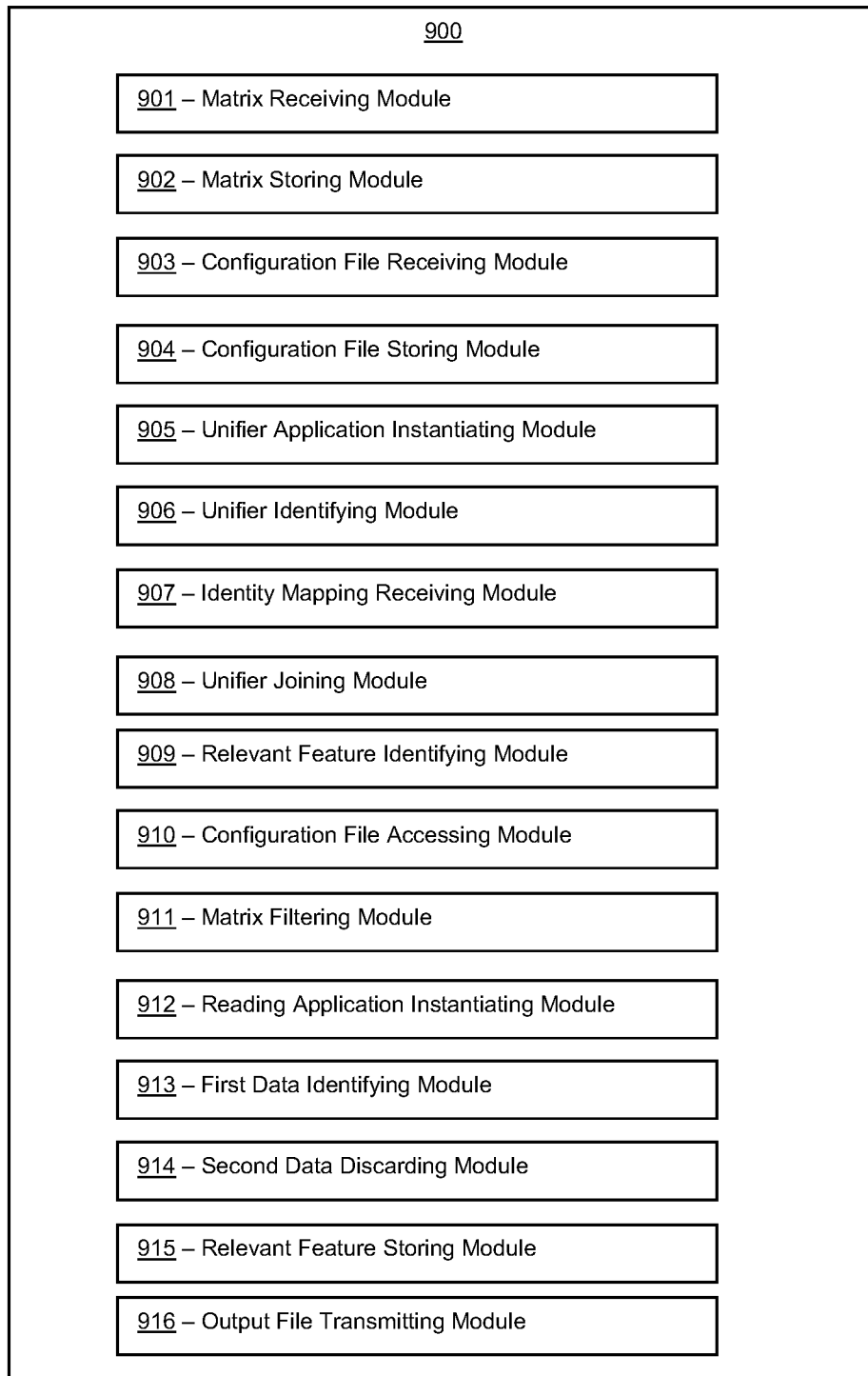
FIG. 9 illustrates a representative block diagram of a system, according to an additional embodiment.

Turning ahead in the drawings, FIG. 9 illustrates a block diagram of a system 900 that can be employed for behavior based messaging. System 900 is merely exemplary and embodiments of the system are not limited to the embodiments presented herein. System 900 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 900.

Generally, therefore, system 900 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 900 described herein.

In many embodiments, system 900 can comprise non-transitory memory storage module 901. Memory storage module 901 can be referred to as matrix receiving module 901. In many embodiments, matrix receiving module 901 can store computing instructions configured to run on one or more processing modules and perform one or more acts of method 700 (FIG. 7) (e.g., activity 701 (FIG. 7)).

In many embodiments, system 900 can comprise non-transitory memory storage module 902. Memory storage module 902 can be referred to as matrix storing module 902. In many embodiments, matrix storing module 902 can store computing instructions configured to run on one or more processing modules and perform one or more acts of method 700 (FIG. 7) (e.g., activity 702 (FIG. 7)).

In many embodiments, system 900 can comprise non-transitory memory storage module 903. Memory storage module 903 can be referred to as configuration file receiving module 903. In many embodiments, configuration file receiving module 903 can store computing instructions configured to run on one or more processing modules and perform one or more acts of method 700 (FIG. 7) (e.g., activity 703 (FIG. 7)).

In many embodiments, system 900 can comprise non-transitory memory storage module 904. Memory storage module 904 can be referred to as configuration file storing module 904. In many embodiments, configuration file storing module 904 can store computing instructions configured to run on one or more processing modules and perform one or more acts of method 700 (FIG. 7) (e.g., activity 704 (FIG. 7)).

In many embodiments, system 900 can comprise non-transitory memory storage module 905. Memory storage module 905 can be referred to as unifier application instantiating module 905. In many embodiments, unifier application instantiating module 905 can store computing instructions configured to run on one or more processing modules and perform one or more acts of method 700 (FIG. 7) (e.g., activity 705 (FIG. 7)).

In many embodiments, system 900 can comprise non-transitory memory storage module 906. Memory storage module 906 can be referred to as unifier identifying module 906. In many embodiments, unifier identifying module 906 can store computing instructions configured to run on one or more processing modules and perform one or more acts of method 700 (FIG. 7) (e.g., activity 706 (FIG. 7)).

In many embodiments, system 900 can comprise non-transitory memory storage module 907. Memory storage module 907 can be referred to as identity mapping receiving module 907. In many embodiments, identity mapping receiving module 907 can store computing instructions configured to run on one or more processing modules and perform one or more acts of method 700 (FIG. 7) (e.g., activity 707 (FIG. 7)).

In many embodiments, system 900 can comprise non-transitory memory storage module 908. Memory storage module 908 can be referred to as unifier joining module 908. In many embodiments, unifier joining module 908 can store computing instructions configured to run on one or more processing modules and perform one or more acts of method 700 (FIG. 7) (e.g., activity 708 (FIG. 7)).

In many embodiments, system 900 can comprise non-transitory memory storage module 909. Memory storage module 909 can be referred to as relevant feature identifying module 909. In many embodiments, relevant feature identifying module 909 can store computing instructions configured to run on one or more processing modules and perform one or more acts of method 700 (FIG. 7) (e.g., activity 709 (FIG. 7)).

In many embodiments, system 900 can comprise non-transitory memory storage module 910. Memory storage module 910 can be referred to as configuration file accessing module 910. In many embodiments, configuration file accessing module 910 can store computing instructions configured to run on one or more processing modules and perform one or more acts of method 700 (FIG. 7) (e.g., activity 710 (FIG. 7)).

In many embodiments, system 900 can comprise non-transitory memory storage module 911. Memory storage module 911 can be referred to as matrix filtering module 911. In many embodiments, matrix filtering module 911 can store computing instructions configured to run on one or more processing modules and perform one or more acts of method 700 (FIG. 7) (e.g., activity 711 (FIG. 7)).

In many embodiments, system 900 can comprise non-transitory memory storage module 912. Memory storage module 912 can be referred to as reading application instantiating module 912. In many embodiments, reading application instantiating module 912 can store computing instructions configured to run on one or more processing modules and perform one or more acts of method 700 (FIG. 7) (e.g., activity 712 (FIG. 7)).

In many embodiments, system 900 can comprise non-transitory memory storage module 913. Memory storage module 913 can be referred to as first data identifying module 913. In many embodiments, first data identifying module 913 can store computing instructions configured to run on one or more processing modules and perform one or more acts of method 700 (FIG. 7) (e.g., activity 713 (FIG. 7)).

In many embodiments, system 900 can comprise non-transitory memory storage module 914. Memory storage module 914 can be referred to as second data discarding module 914. In many embodiments, second data discarding module 914 can store computing instructions configured to run on one or more processing modules and perform one or more acts of method 700 (FIG. 7) (e.g., activity 714 (FIG. 7)).

In many embodiments, system 900 can comprise non-transitory memory storage module 915. Memory storage module 915 can be referred to as relevant feature storing module 915. In many embodiments, relevant feature storing module 915 can store computing instructions configured to run on one or more processing modules and perform one or more acts of method 700 (FIG. 7) (e.g., activity 715 (FIG. 7)).

In many embodiments, system 900 can comprise non-transitory memory storage module 916. Memory storage module 916 can be referred to as output file transmitting module 916. In many embodiments, output file transmitting module 916 can store computing instructions configured to run on one or more processing modules and perform one or more acts of method 700 (FIG. 7) (e.g., activity 716 (FIG. 7)).

Figure 10:
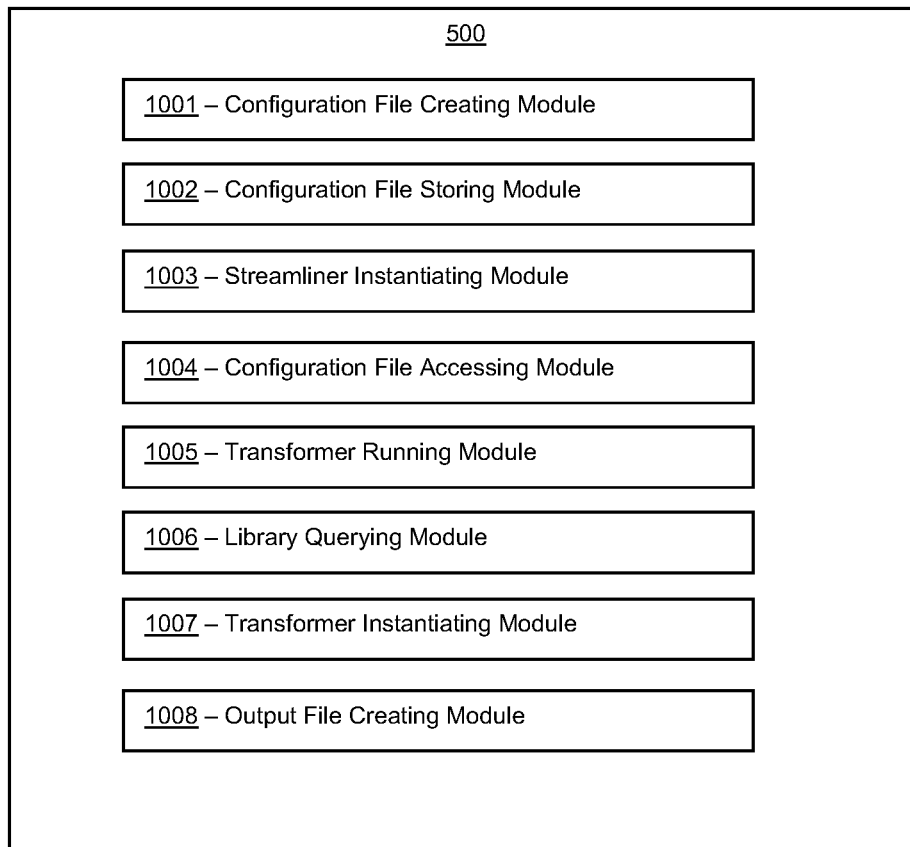
FIG. 10 illustrates a representative block diagram of a system, according to an additional embodiment.

Turning ahead in the drawings, FIG. 10 illustrates a block diagram of a system 1000 that can be employed for behavior based messaging. System 1000 is merely exemplary and embodiments of the system are not limited to the embodiments presented herein. System 1000 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 1000.

Generally, therefore, system 1000 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1000 described herein.

In many embodiments, system 1000 can comprise non-transitory memory storage module 1001. Memory storage module 1001 can be referred to as configuration file creating module 1001. In many embodiments, configuration file creating module 1001 can store computing instructions configured to run on one or more processing modules and perform one or more acts of method 800 (FIG. 8) (e.g., activity 801 (FIG. 8)).

In many embodiments, system 1000 can comprise non-transitory memory storage module 1002. Memory storage module 1002 can be referred to as configuration file storing module 1002. In many embodiments, configuration file storing module 1002 can store computing instructions configured to run on one or more processing modules and perform one or more acts of method 800 (FIG. 8) (e.g., activity 802 (FIG. 8)).

In many embodiments, system 1000 can comprise non-transitory memory storage module 1003. Memory storage module 1003 can be referred to as streamliner instantiating module 1003. In many embodiments, streamliner instantiating module 1003 can store computing instructions configured to run on one or more processing modules and perform one or more acts of method 800 (FIG. 8) (e.g., activity 803 (FIG. 8)).

In many embodiments, system 1000 can comprise non-transitory memory storage module 1004. Memory storage module 1004 can be referred to as configuration file accessing module 1004. In many embodiments, configuration file accessing module 1004 can store computing instructions configured to run on one or more processing modules and perform one or more acts of method 800 (FIG. 8) (e.g., activity 804 (FIG. 8)).

In many embodiments, system 1000 can comprise non-transitory memory storage module 1005. Memory storage module 1005 can be referred to as transformer running module 1005. In many embodiments, transformer running module 1005 can store computing instructions configured to run on one or more processing modules and perform one or more acts of method 800 (FIG. 8) (e.g., activity 805 (FIG. 8)).

In many embodiments, system 1000 can comprise non-transitory memory storage module 1006. Memory storage module 1006 can be referred to as library querying module 1006. In many embodiments, library querying module 1006 can store computing instructions configured to run on one or more processing modules and perform one or more acts of method 800 (FIG. 8) (e.g., activity 806 (FIG. 8)).

In many embodiments, system 1000 can comprise non-transitory memory storage module 1007. Memory storage module 1007 can be referred to as transformer instantiating module 1007. In many embodiments, transformer instantiating module 1007 can store computing instructions configured to run on one or more processing modules and perform one or more acts of method 800 (FIG. 8) (e.g., activity 807 (FIG. 8)).

In many embodiments, system 1000 can comprise non-transitory memory storage module 1008. Memory storage module 1008 can be referred to as output file creating module 1008. In many embodiments, output file creating module 1008 can store computing instructions configured to run on one or more processing modules and perform one or more acts of method 800 (FIG. 8) (e.g., activity 808 (FIG. 8)).

Although systems and methods for a machine learning framework have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIG. 7 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors cause the one or more processors to perform operations comprising:
   receiving, from an extraction, transform, load (ETL) application, a matrix comprising raw feature data;
   storing the matrix comprising the raw feature data in a standard format in one or more storage devices;
   receiving a configuration file over a computer network, wherein the configuration file is configured to identify features for use in a respective machine learning algorithm and a time period in which to collect the features, and wherein the configuration file is further configured to be transferable between machine learning models using a same set of unifiers and feature data;
   storing the configuration file in a standard format in the one or more storage devices;
   reading one or more tuples in the configuration file, as stored;
   instantiating one or more unifier applications specified in a first portion of a respective tuple in the one or more tuples in the configuration file;
   identifying selected feature data of the raw feature data using the configuration file and the one or more unifier applications;
   collecting, by the one or more unifier applications, historical transactions at a division level for users over the time period;
   creating, by the one or more unifier applications, subsets of the historical transactions within the time period;

storing the selected feature data in a training schema format and the subset of the historical transactions in an output file in the one or more storage devices, wherein the training schema format comprises at least one synthetic feature generated as a function of two or more pre-existing features;

transmitting, over the computer network in real time to a model building system, the output file comprising the selected feature data from the one or more storage devices for use in a machine learning application;

training a machine learning model of the machine learning application on the selected feature data in the training schema format using the model building system and one or more building applications; and generating a machine learning algorithm for the machine learning model based on parameters in the output file, wherein the output file is configured to be transferred between different machine learning models.

2. The system of claim 1, wherein instantiating the one or more unifier applications comprises:
  accessing the configuration file to identify a list of unifier applications comprising the one or more unifier applications.

3. The system of claim 1, wherein identifying the selected feature data comprises:
  filtering the matrix comprising the raw feature data to remove data from the raw feature data not characterized by a second portion of the respective tuple in the one or more tuples, the second portion of the respective tuple comprising at least one of:
    (1) a start date;
    (2) a direction; or
    (3) a duration.

4. The system of claim 1, wherein the computing instructions, when executed on the one or more processors, further cause the one or more processors to perform operations comprising:
  receiving, from the ETL application, an identity mapping to a specific user to which the raw feature data pertains;
  joining, using the identity mapping, the one or more unifier applications such that the specific user is identified, wherein each of the one or more unifier applications are joined using different unique IDs in the identity mapping;
  identifying, by the configuration file, the selected feature data used to build the machine learning algorithm, wherein the selected feature data is collected over the time period;
  modifying one or more fields of the configuration file into a modified configuration file;
  saving the modified configuration file; and
  reusing the modified configuration file to create other machine learning models based on at least one of (i) the one or more unifier applications or (ii) the selected feature data.

5. The system of claim 4, wherein joining, using the identity mapping, the one or more unifier applications comprise at least one of:
  using the identity mapping as a key to perform a left join;
  using the identity mapping as the key to perform a right join; or
  using the identity mapping as the key to perform a full join.

6. The system of claim 1, wherein the selected feature data is stored in the output file as a sparse representation of the selected feature data, the sparse representation comprising a feature vector having only non-zero counts of the selected feature data.

7. The system of claim 1, wherein identifying the selected feature data of the raw feature data comprises:
  instantiating one or more reader applications;
  identifying, using the one or more reader applications, first data comprising a first type of the raw feature data; and
  discarding second data of the raw feature data that does not comprise the first type of the raw feature data.

8. The system of claim 7, wherein the raw feature data comprises at least one of:
  a text file;
  a sequence file;
  a compressed file; or
  a partitioned file.

9. The system of claim 7, wherein identifying, using the one or more reader applications, the first data comprising the first type of the raw feature data comprises:
  identifying a delimiter in the raw feature data; and
  separating the raw feature data into the first type of the raw feature data and a second type of the raw feature data based upon a location of the delimiter.

10. The system of claim 1, wherein identifying the selected feature data of the raw feature data comprises:
  identifying a Unix path expression for a storage location of the selected feature data of the raw feature data.

11. A method being implemented via execution of computing instructions configured to run at one or more processors and stored at non-transitory computer-readable media, the method comprising:
  receiving, from an extraction, transform, load (ETL) application, a matrix comprising raw feature data;
  storing the matrix comprising the raw feature data in a standard format in one or more storage devices;
  receiving a configuration file over a computer network, wherein the configuration file is configured to identify features for use in a respective machine learning algorithm and a time period in which to collect the features, and wherein the configuration file is further configured to be transferable between machine learning models using a same set of unifiers and feature data;
  storing the configuration file in a standard format in the one or more storage devices;
  reading one or more tuples in the configuration file, as stored;
  instantiating one or more unifier applications specified in a first portion of a respective tuple in the one or more tuples in the configuration file;
  identifying selected feature data of the raw feature data using the configuration file and the one or more unifier applications;
  collecting, by the one or more unifier applications, historical transactions at a division level for users over the time period;
  creating, by the one or more unifier applications, subsets of the historical transactions within the time period;
  storing the selected feature data in a training schema format and the subset of the historical transactions in an output file in the one or more storage devices, wherein the training schema format comprises at least one synthetic feature generated as a function of two or more pre-existing features;
  transmitting, over the computer network in real time to a model building system, the output file comprising the selected feature data from the one or more storage devices for use in a machine learning application;

training a machine learning model of the machine learning application on the selected feature data in the training schema format using the model building system and one or more building applications; and generating a machine learning algorithm for the machine learning model based on parameters in the output file, wherein the output file is configured to be transferred between different machine learning models.

12. The method of claim 11, wherein instantiating the one or more unifier applications comprises:

accessing the configuration file to identify a list of unifier applications comprising the one or more unifier applications.

13. The method of claim 11, wherein identifying the selected feature data comprises:

filtering the matrix comprising the raw feature data to remove data from the raw feature data not characterized by a second portion of the respective tuple in the one or more tuples, the second portion of the respective tuple comprising at least one of:
(1) a start date;
(2) a direction; or
(3) a duration.

14. The method of claim 11 further comprising:

receiving, from the ETL application, an identity mapping to a specific user to which the raw feature data pertains;

joining, using the identity mapping, the one or more unifier applications such that the specific user is identified, wherein each of the one or more unifier applications are joined using different unique IDs in the identity mapping;

identifying, by the configuration file, the selected feature data used to build the machine learning algorithm, wherein the selected feature data is collected over the time period;

modifying one or more fields of the configuration file into a modified configuration file;

saving the modified configuration file; and reusing the modified configuration file to create other machine learning models based on at least one of (i) the one or more unifier applications or (ii) the selected feature data.

15. The method of claim 14, wherein joining, using the identity mapping, the one or more unifier applications comprise at least one of:

using the identity mapping as a key to perform a left join;
using the identity mapping as the key to perform a right join; or
using the identity mapping as the key to perform a full join.

16. The method of claim 11, wherein the selected feature data is stored in the output file as a sparse representation of the selected feature data, the sparse representation comprising a feature vector having only non-zero counts of the selected feature data.

17. The method of claim 11, wherein identifying the selected feature data of the raw feature data comprises:

instantiating one or more reader applications;

identifying, using the one or more reader applications, first data comprising a first type of the raw feature data; and discarding second data of the raw feature data that does not comprise the first type of the raw feature data.

18. The method of claim 17, wherein the raw feature data comprises at least one of:
a text file;
a sequence file;
a compressed file; or
a partitioned file.

19. The method of claim 17, wherein identifying, using the one or more reader applications, the first data comprising the first type of the raw feature data comprises:

identifying a delimiter in the raw feature data; and separating the raw feature data into the first type of the raw feature data and a second type of the raw feature data based upon a location of the delimiter.

20. The method of claim 11, wherein identifying the selected feature data of the raw feature data comprises:

identifying a Unix path expression for a storage location of the selected feature data of the raw feature data.

* * * * *